June 18, 1968   R. W. MOWELL ET AL   3,388,724

SUBMARINE INSULATED LNG PIPELINE

Filed April 5, 1965

ROGER W. MOWELL
JOHN MASCENIK         INVENTORS

BY  Donald F. Wohlers

PATENT ATTORNEY

United States Patent Office 3,388,724
Patented June 18, 1968

3,388,724
SUBMARINE INSULATED LNG PIPELINE
Roger W. Mowell, West Caldwell, and John Mascenik, Mount Tabor, N.J., assignors to Esso Research and Engineering Company, a corporation of Delaware
Filed Apr. 5, 1965, Ser. No. 445,551
7 Claims. (Cl. 138—149)

ABSTRACT OF THE DISCLOSURE

The pipeline of this disclosure includes a rigid insulation material applied to the interior surface of an outer casing pipe. A gap is left between said insulation and the exterior of an inner conduit which is maintained in coaxial spaced relationship with said outer casing pipe. Each section of the inner conduit is independently mechanically supported from the adjacent section of the casing pipe. One end of each inner conduit section is fixed securely to the casing pipe while the opposite end of each inner conduit section is free to expand and contract independently of the surrounding insulation and independent of the adjacent inner conduit sections.

---

This invention relates to pipelines and in general to improvements in insulated pipelines wherein large temperature variations produce substantial changes in the linear dimension of the pipeline. In particular the present invention relates to an improved insulated pipeline for transporting cryogenic liquids such as liquefied natural gas (LNG) at approximately −260° F. While the invention is disclosed herein as being particularly adaptable to application in a submarine LNG pipeline, those skilled in the art will readily appreciate that the invention may also be employed to an advantage in overland or buried pipelines as well. Those skilled in the art will also appreciate that while the invention is described in connection with low temperature fluids, it may also be employed with high temperature fluids wherein similar changing dimension problems exist.

In accordance with the invention, the pipeline is constructed with a plurality of similar pipe sections of substantially equal predetermined length which are connected in end to end relationship as by welding. Each pipe section comprises an inner fluid transporting conduit and an outer casing pipe surrounding the inner conduit and providing the supporting surface necessary for the insulation medium. The inner and outer pipes of each pipe section are held in substantial coaxial spaced relationship by a plurality of spacing means at one end of the pipe fixedly locating the inner pipe to the outer casing pipe at that end. At the other end of the pipe a plurality of similar spacers are connected only at their outside portions to the outer casing pipe. The inner portions of these spacers terminate closely adjacent the exterior surface of the inner pipe and act to support that end of the pipe yet allowed free axial movement thereof due to temperature changes and the resulting contraction and expansion of the inner pipe. The thermal insulation employed may be any suitable type and is, in accordance with the invention, secured to the inside surface of the outer casing pipe and extends inwardly to a position adjacent to the inner pipe, but not in contact therewith. The dead air space thus provided between the insulation and the exterior of the inner pipe enhances the overall insulation efficiency and, in addition, permits changes in the axial length of the inner pipe without imparting stress to the surrounding insulation. Each pipe section is provided with a suitable expansion and contraction compensation means such as a bellows for connection to the adjacent pipe section. In this way upon the joining of a plurality of pipe sections in accordance with the foregoing description, a pipeline is produced wherein no large expansion and contraction loops are required, inasmuch as each pipe section includes its own compensating means for permitting thermal expansion and contraction of the individual pipe section without influencing adjacent pipe sections.

Accordingly, it is the principal object of the present invention to provide a novel and improved insulated pipeline.

Another object of the invention is to provide an insulated pipeline wherein each component pipe section thereof contains its own individual means for compensating for changes in dimension occurring in that section due to temperature changes of that section.

Another object of the invention is to provide an improved insulated pipeline wherein changes in the linear dimension in the fluid transporting conduit do not create structural stress in the surrounding insulation.

Another object of the invention is to provide a novel submarine pipeline not requiring large expansion loops to compensate for changes in length thereof.

Another object of the invention is to provide an improved submarine pipeline which is reliable in operation, low in cost and economical to maintain.

These and other objects of the invention will become more apparent and the invention will become fully understood by reference to the following specification and drawings in which.

Figure 1:
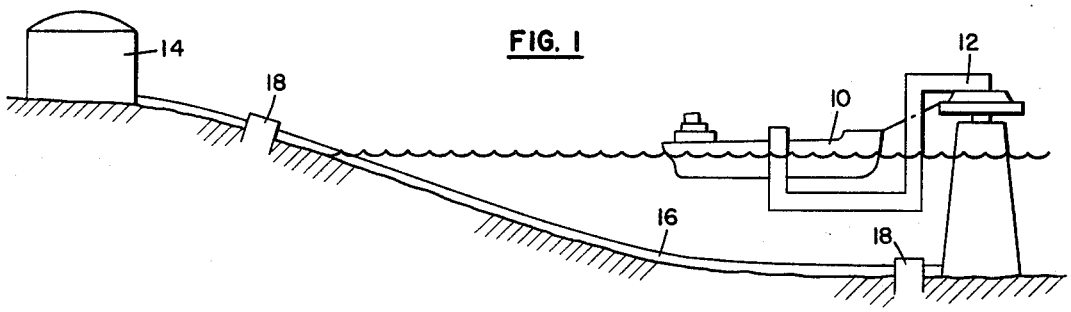
FIG. 1 is a schematic plan view of a pipeline in accordance with the invention in a submerged environment as it would be employed with an offshore ship mooring and loading device.

Referring to the drawings in particular, a tanker vessel generally indicated at 10 is shown moored to an offshore mooring and loading station 12. A shore storage facility 14 communicates through a pipeline 16 lying on the sea bottom to the mooring device 12 whereupon the fluid traveling through the pipeline 16 may be directed via suitable conduits (not shown) to the tanker vessel 10. A pair of anchoring means 18 are located at substantially opposite ends of the pipeline 16 and serve to fixedly mount the outer casing of the insulated pipeline 16 to the supporting structure.

Figure 2:
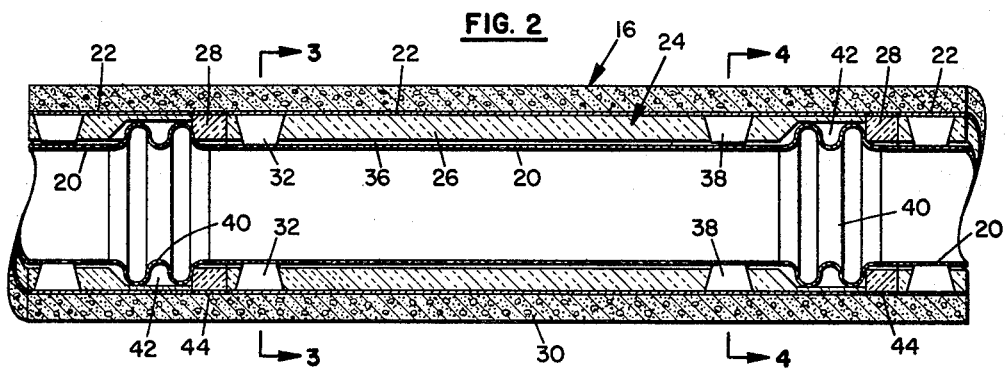
FIG. 2 is a cross-sectional view of a single pipe section of the novel pipeline showing end portions of the adjacent pipe sections attached thereto.
Figure 3:
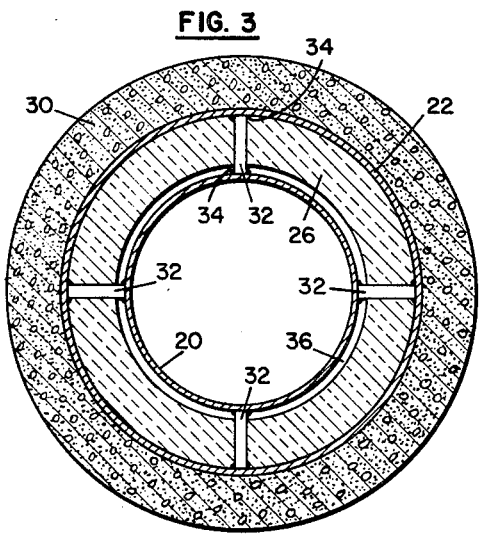
FIG. 3 is a vertical cross-sectional view of the invention taken along line 3—3 of FIG. 2.
Figure 4:
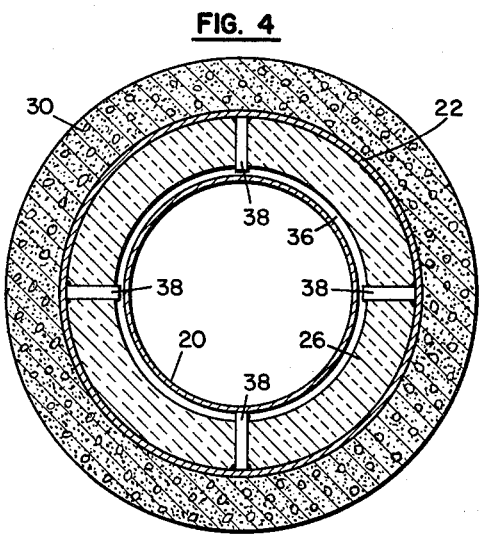
FIG. 4 is a cross-sectional view similar to FIG. 3 taken along line 4—4 of FIG. 2.

Referring to FIGS. 2, 3 and 4, the pipeline 16 includes a plurality of inner pipe sections 20 of predetermined and substantially uniform length. Each of the pipe sections includes an outer casing pipe 22 of approximately similar length to said inner conduit 20 and slightly staggered relative thereto. Secured to the inner surface of the casing pipe 22 is an annular layer of insulation generally designated 24. The insulation 24 includes a main elongated portion 26 extending for substantially the length of each pipe section and a separate end joint section 28 overlying the welded connections between adjacent sections of the inner pipe 20. Secured to the outer periphery of the casing pipe 22 is a concrete jacket 30 which provides the necessary mass to maintain the pipeline 16 in a submerged condition on the floor of the sea. The jacket 30 also provides an outer environmental protective coating about the casing pipe 22. At the left end of the full pipe section shown in FIG. 2 are a plurality of radially extending supporting spacers or spokes 32 fixedly secured by weld 34 at their inner and outer ends to respectively the inner conduit 20 and the outer casing pipe 22. The spacers 32 are slightly longer in radial length than the thickness of the insulation 26 and thereby provide an inner gap 36 exterior of the inner conduit 20. This gap may be filled with an inert gas for safety considerations or may be under a partial vacuum in which case the overall thermal insulation efficiency would be enhanced. At the opposite end of each of the pipe sections are a second plurality of slightly shorter support spacers or spokes designated 38. These spokes 38 are secured at their outermost ends by welds 34 to the interior of the casing pipe 22 in a fashion similar to the spokes 32. However, the radial length of each of the spokes 38 is selected to be slightly shorter than the corresponding spokes 32 so that a sliding fit is maintained between these spokes and the exterior of the inner conduit 20. Each of the pipe sections also includes an expansion and contraction bellows 40 to permit either a lengthening or a foreshortening of each individual pipe section relative to its adjacent pipe section. The bellows 40 are shown in conventional corrugated form but it should be understood that the invention is not limited to the specific type of bellows dimension compensation means illustrated. Due to the enlarged outer diameter of the bellows 40, a relieved portion 42 is provided in the insulation 26.

In the construction of a pipeline in accordance with the invention, a plurality of individual insulated pipe sections, as described, will be welded in end to end relationship in conventional fashion. The welds between the ends of each of the bellows 40 and the adjacent inner conduit 20 will be made first. Thereafter, the annular collar joint insulation section 28 is placed over the weld previously made and a subsequent band 44 of diameter equal to the outer casing 22 is welded to connect adjacent casing sections as indicated in the figures.

In operation, the pipeline would normally be installed in an empty state. Upon first introduction of either a heated fluid or, in the alternative, a cooled fluid such as LNG at cyrogenic temperatures, a cooling and a corresponding contraction of the inner pipe length 20 would occur. However, because of the invention, each pipe length could foreshorten in length toward its fixed end determined by the locations of the fixed radial spacers 32 while the freely floating end opposite thereto adjacent the spacers 38 would be free to slide toward the fixed spacer end 32. Similar contractions of each individual pipe section would occur throughout the entire length of the pipeline and in view thereof no provision for large or complex expansion loops need be made. Accordingly, the anchors 18 may rigidly secure the outer casing pipe 22 and jacket 30 to the supporting land structure.

While a specific embodiment of the invention has been shown and described in detail to illustrate the application of the inventive principles, it will be understood that the invention may be embodied otherwise without departing from such principles.

What is claimed is:

1. An insulated pipeline for the transport of liquids at cryogenic temperatures comprising a plurality of similar pipe sections of substantially equal predetermined lengths connected in end to end relationship; each of said pipe sections including an inner conduit, an outer casing pipe surrounding said inner conduit and spaced therefrom, a first plurality of spoke-like radial spacers between one end of said inner conduit and said casing pipe, said spoke-like spacers fixedly securing said conduit and said pipe and preventing axial movement therebetween at said one end, a second plurality of spoke-like radial spacers at the opposite end of said inner conduit for maintaining said conduit and said casing pipe in spaced coaxial relation and for permitting relative axial movement between said inner conduit and casing pipe at said opposite end, an expansion bellows affixed to an end of said inner conduit, insulation means secured to the inside surface of said casing pipe, said insulation means having a radial thickness less than the spacing between the casing pipe and inner conduit thereby producing a gap between said insulation means and said conduit and permitting said conduit to change in axial dimension without imparting stress to said insulation means.

2. A pipe section for use in a pipeline made of a plurality of said sections comprising an inner conduit, an outer casing pipe surrounding said inner conduit and spaced therefrom, a first plurality of spacers between one end of said inner conduit and said casing pipe, said spacers fixedly securing said conduit and said pipe and preventing axial movement therebetween at said one end, a second plurality of radial spacers at the opposite end of said inner conduit for maintaining said conduit and said casing pipe in spaced substantially coaxial relation and for permitting relative axial movement between said inner conduit and casing pipe at said opposite end, and insulation means secured to the inside surface of said casing pipe and said insulation means is of radial thickness less than the spacing between the casing pipe and said inner conduit thereby producing an air gap between said insulation means and said conduit and permitting said conduit to change in axial and radial dimension without imparting stress to said insulation means.

3. A pipeline in accordance with claim 1 including concrete jacket means surrounding said casing pipe for maintaining said pipeline in a submerged and non-buoyant condition on the sea bottom.

4. A pipe section in accordance with claim 1 including an expansion bellows affixed to an end of said inner conduit.

5. A pipe section in accordance with claim 1 wherein said second plurality of radial spacers includes means securing the outer ends to the interior wall of said casing pipe, thereby substantially preventing axial shift of said second plurality of radial spacers relative to said insulation means during expansion and contraction of said inner conduit.

6. An insulated pipeline in accordance with claim 3 including means at opposite ends of said pipeline for rigidly anchoring said concrete jacket means and enclosed outer casing pipe thereby preventing axial shift thereof with respect to the supporting surface irrespective of expansion and contraction of the inner conduit during changes in operating temperature thereof.

7. The pipeline of claim 1 wherein said gap is filled with an inert gas.

References Cited
UNITED STATES PATENTS

| | | | |
|---|---|---|---|
| 2,611,567 | 9/1952 | Williamson | 238—149 X |
| 3,032,070 | 5/1965 | Isenberg | 138—149 |
| 3,250,297 | 5/1966 | Mooneyham | 138—149 X |
| 3,240,512 | 3/1966 | Pennington et al. | 138—175 X |

LAVERNE D. GEIGER, *Primary Examiner.*

B. KILE, *Assistant Examiner.*